United States Patent

Hammerstrom

Patent Number: 5,369,773
Date of Patent: Nov. 29, 1994

[54] NEURAL NETWORK USING VIRTUAL-ZERO

[75] Inventor: Daniel W. Hammerstrom, Aloha, Oreg.

[73] Assignee: Adaptive Solutions, Inc., Beaverton, Oreg.

[21] Appl. No.: 692,241

[22] Filed: Apr. 26, 1991

[51] Int. Cl.$^5$ .............................................. G06F 12/00
[52] U.S. Cl. ........................... 395/800; 364/251.3; 364/259.5; 364/251; 364/246.3; 364/DIG. 1; 295/425
[58] Field of Search .................... 395/800, 425, 400

[56] References Cited

U.S. PATENT DOCUMENTS

| | | | |
|---|---|---|---|
| 3,919,534 | 11/1975 | Hutson et al. | 395/800 |
| 4,192,010 | 3/1980 | Kerner et al. | 395/775 |
| 4,371,951 | 2/1983 | Kort | 395/800 |
| 4,558,302 | 12/1985 | Welch | 341/51 |
| 4,700,294 | 10/1987 | Haynes | 395/425 |
| 4,807,168 | 2/1989 | Moopenn et al. | 395/27 |
| 4,907,194 | 3/1990 | Yamada et al. | 395/49 |
| 5,057,837 | 10/1991 | Colwell | 341/55 |
| 5,113,523 | 5/1992 | Colley | 395/800 |

Primary Examiner—Eric Coleman
Attorney, Agent, or Firm—Kolisch Hartwell Dickinson McCormack & Heuser

[57] ABSTRACT

A virtual-zero architecture is intended for use in a single instruction stream, multiple data stream (SIMD) processor which includes an input bus, an input unit, manipulation units, an output unit and an output bus. The virtual-zero architecture includes a memory unit (40) for storing data, an arithmetic unit (42) for mathematically operating on the data, a memory address generation unit (32) and an adder for computing a next memory address. The memory address generation unit (32) includes an address register (34) in the memory unit for identifying the address of a particular data block, a counter (38) for counting the number of memory addresses in a particular data block, and a rotation register (36) for providing a data-void address in the memory unit if and only if all of the entries in the data block are zero. The memory (40) and the address (32) units provide zero-value data blocks to the arithmetic unit (44) to simulate the data block having the data-void address during processing. The architecture may also be used to selectively handle input to a system.

3 Claims, 3 Drawing Sheets

NEURAL NETWORK USING VIRTUAL-ZERO

TECHNICAL FIELD

The instant invention relates to a computer processor architecture, and specifically to an architecture which provides a virtual-zero structure in the form of a selective data manipulation architecture to conserve memory usage in a sparse filled matrix or to selectively handle input.

BACKGROUND ART

In neural networks, memory matrixes are defined as being full, which are generally considered to be between 20-30% up to 100% full of non-zero data, and sparse matrixes, which are defined as being less than 20-30% full. A computer memory matrix may be a 1,000×1,000 array, which is capable of holding 1,000,000 words of data. In the case of a sparse matrix, the memory may only be 5% full, containing only 50K words of actual data.

In the case of a neural network type of processor node, the data stored in memory is cycled on a clock, or cycle, basis, with every memory location being acted upon by processor units which manipulate data. Particularly in the case of a matrix that is only 5 to 10% full, a great deal memory space is "filled" with zero information. From an efficiency standpoint, the occupation of hundreds of thousands of memory addresses with zero information is not acceptable. Memory is probably the most expensive component of computer technology.

There are several important practical problems that cannot be solved using existing, conventional algorithms executed by traditional, conventional computers. These problems are often incompletely specified and are characterized by many weak constraints requiring large search spaces.

The processing of primary cognitive information by computers, such as computer speech recognition, computer vision, and robotic control, fall into this category. Traditional computational models bog down to the point of failure under the computational load if they are tasked to solve these types of problems. Yet animals perform these tasks using neurons that are millions of times slower than transistors. Feldman's 100-step rule states that a "human" cognitive process having a time of 500 msec. can be accomplished in 5 msec neuron switching time. This implies that there are two vastly different computational models at work. It also suggests that in order to build computers that will do what nervous systems do, the computers should be structured more like nervous systems.

A nervous system, and a neurocomputational computer, is characterized by continuous, non-symbolic, and massively parallel structure that is fault-tolerant of input noise and hardware failure. Representations, ie, the input, is distributed among groups of computing elements, which independently reach a result or conclusion, and which then generalize and interpolate information to reach a final output conclusion.

Put another way, connectionist/neural networks search for "good" solutions using massively parallel computations of many small computing elements. The model is one of parallel hypothesis generation and relaxation to the dominant, or "most-likely" hypothesis. The search speed is more or less independent of the size of the search space. Learning is a process of incrementally changing the connection (synaptic) strengths, as opposed to allocating data structures. "Programming" in such a neural network is by example.

DISCLOSURE OF THE INVENTION

An object of the invention is to provide a processor architecture which eliminates the storage of superfluous zero-type data for neural network emulation.

Another object of the invention is to provide a processor which analyzes a data string for non-zero values and conventionally stores such a data string.

A further object of the invention is to provide a processor which will generate "compressed" zero data strings to simulate zero-filled memory.

Still another object of the invention is to provide a computer architecture which will allow a manipulation unit to operate on selected portions of an input vector.

The virtual-zero architecture of the invention is intended for use in a single instruction stream, multiple data stream (SIMD) processor which includes an input bus, an input unit, manipulation units, an output unit and an output bus. The virtual-zero architecture includes a memory unit for storing data, an arithmetic unit for mathematically operating on the data, a memory address generation unit with an adder for computing a next memory address. The memory address generation unit includes an address register in the memory unit for identifying the address of a particular data block, a counter for counting the number of memory addresses in a particular data block, and a shift register for providing a data-void address in the memory unit if and only if all of the entries in the data block are zero. The memory and the address unit provide zero-value data blocks to the arithmetic unit to simulate the data block having the data-void address during processing.

These and other objects and advantages of the invention will become more fully apparent as the description which follows is read in conjunction with the drawings.

BEST MODE FOR CARRYING OUT THE INVENTION

The virtual-zero architecture of the invention is primarily intended for use in single instruction stream, multiple data stream (SIMD) processors, which may be part of a neural computer for emulating a neural network. It should be understood that the virtual-zero architecture may be used in other types of processor units. The normal SIMD processor node includes an input unit, a logic unit, an addition unit, a multiplier unit, a register unit, an output unit, and a weight address memory unit, which are collectively referred to herein as manipulation units.

A single processor node (PN) may contain two or more connection nodes (CN) which provide data manipulation capabilities for the PN. A CN is a state associated with an emulated node in a neural network located in a PN. Each PN may have several CNs located therein. The PNs may broadcast to other PNs to transfer data and instructions.

Figure 1:
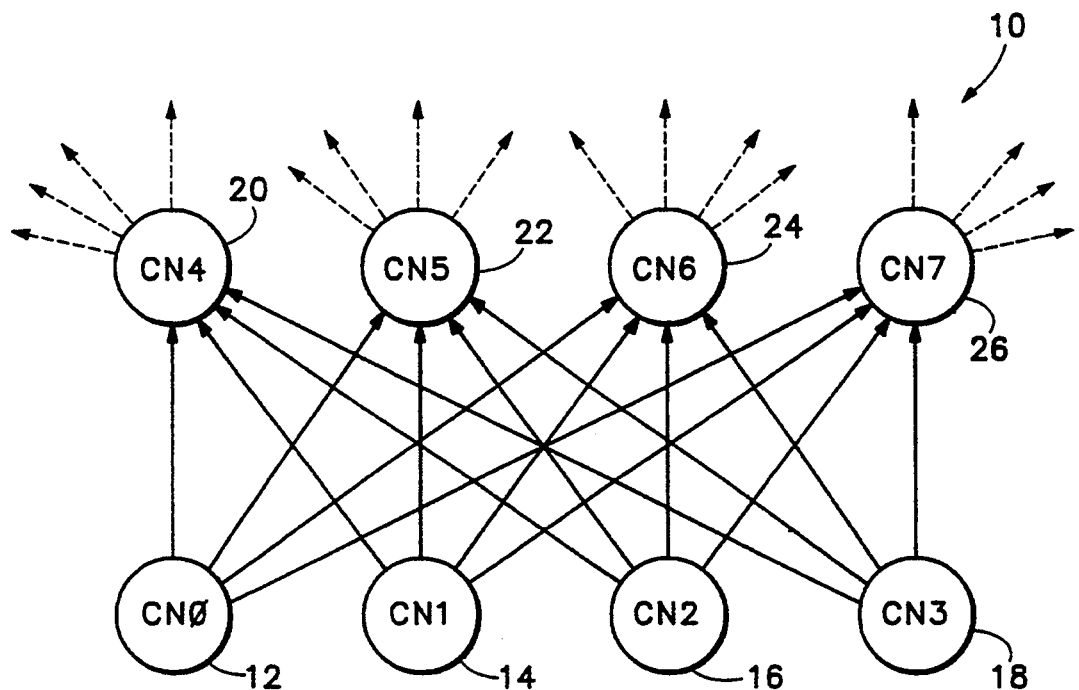
FIG. 1 is a schematic diagram of a broadcast communication pattern of communication nodes contained within processor nodes of a SIMD architecture neural network.

Referring initially to FIG. 1, broadcast patterns in an array 10 of PNs which contain connection nodes 0–7 (12, 14, 16, 18, 20, 22, 24 and 26, respectively) are depicted. The CNs are arranged in "layers", with CN0–CN3 comprising one layer, while CN4–CN7 comprise a second layer. The array depicted would generally include four PNs, with CN0 and CN4 being located in a first PN, CN1 and CN5 being located in a second PN, etc. There may be more than two layers of connection nodes in any one processor node or in any array of processor nodes. The connection nodes operate in what is referred to as a broadcast hierarchy, wherein each of connection nodes 0–3 broadcast to each of connection nodes 4–7. An illustrative technique for arranging such a broadcast hierarchy is disclosed in U.S. Pat. No. 4,796,199, NEURAL-MODEL INFORMATION-HANDLING ARCHITECTURE AND METHOD, to Hammerstrom et al, Jan. 3, 1989, which is incorporated herein by reference.

Conceptually, the available processor nodes may be thought of as a "layer" of processors, each executing its function (multiply, accumulate, and increment weight index) for each input, on each clock, wherein one processor node broadcasts its output to all other processor nodes. By using the output processor node arrangement, it is possible to provide $n^2$ connections in n clocks using only a two layer arrangement. Known, conventional SIMD structures may accomplish $n^2$ connections in n clocks, but require a three layer configuration, or 50% more structure. The boundaries of the individual chips do not interrupt broadcast through processor node arrays, as the arrays may span as many chips as are provided in the architecture.

In a sparse matrix, some of the connections between the CNs may not exist, and are represented by zero data.

Figure 2:
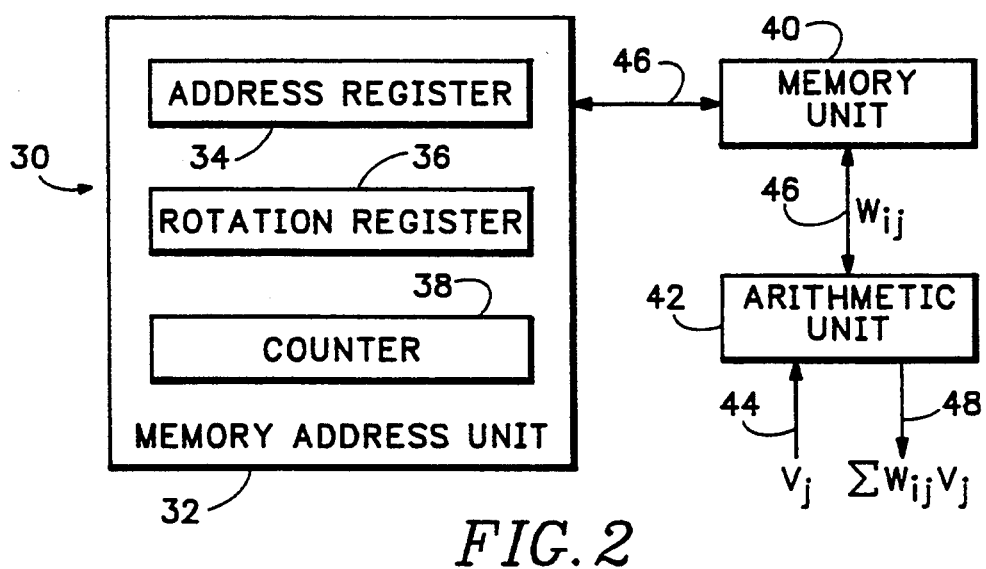
FIG. 2 is a schematic, block diagram of a virtual-zero architecture which is part of a SIMD processor.

Referring now to FIG. 2, a virtual-zero architecture is depicted generally at 30. Architecture 30 includes a memory address generation unit 32 which further includes an address register 34, a rotation register 36 and a counter 38. Architecture 30 also includes a memory unit 40 and an arithmetic unit 42.

Information enters architecture 30 over an input bus 44. Information moves between the memory address generation unit, the memory unit and the arithmetic unit on an internal bus 46. An output bus 48 is provided to transfer information from the virtual-zero architecture to other components of the processor node.

Figure 3:
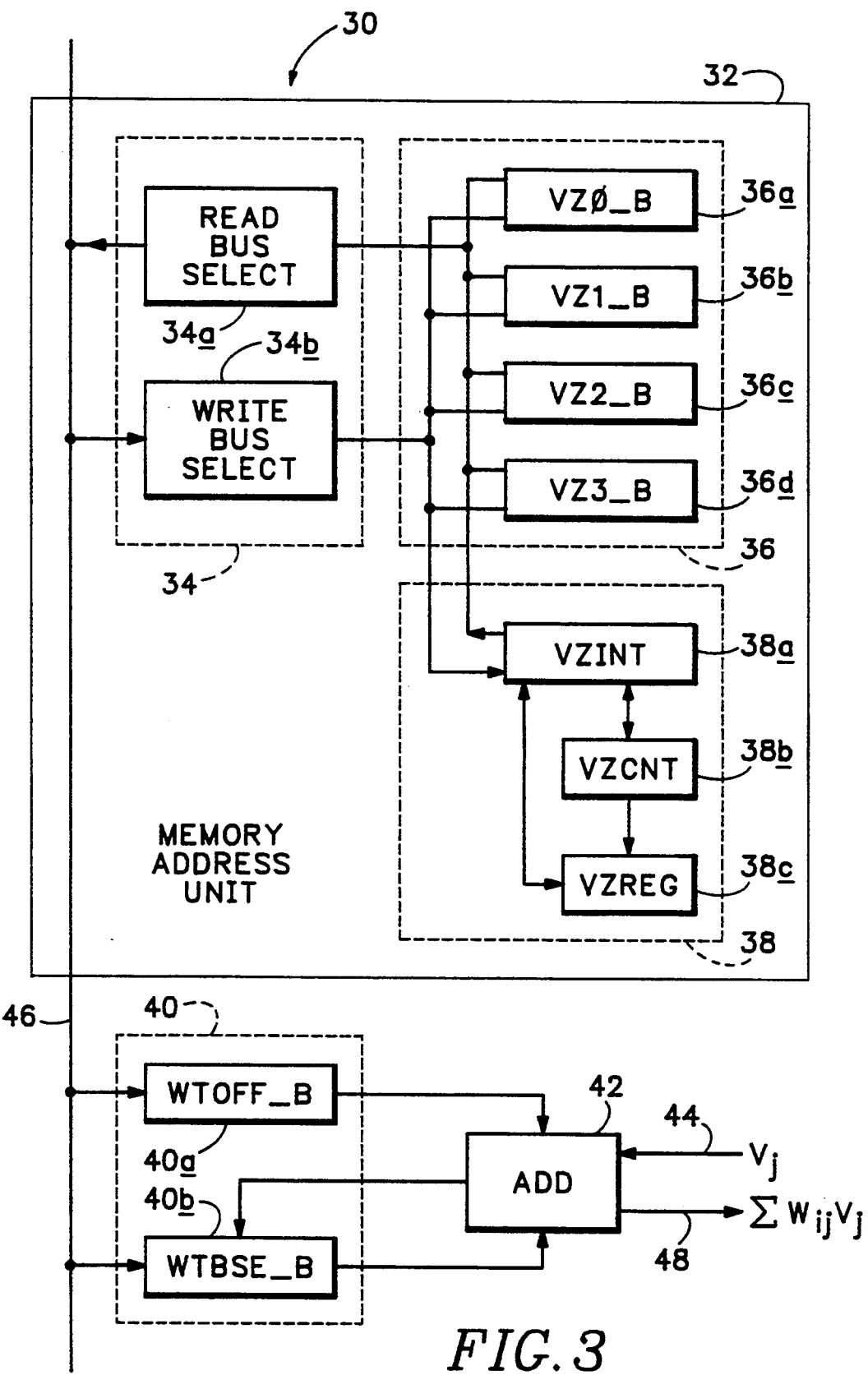
FIG. 3 is a block diagram of the various registers and manipulation units of the virtual-zero architecture of FIG. 1, shown in greater detail.

Referring now to FIG. 3, the architecture of FIG. 2 is shown in greater detail. Among the components in address register 34 are a read bus select module 34a and a write bus select module 34b, which determine whether rotation register 36 will be read or written to.

In the preferred embodiment, rotation register 36 includes 4 16-bit virtual-zero registers, which are designated VZ0_B, 36a, VZ1_B, 36b, VZ2_B, 36c and VZ3_B, 36d. These virtual-zero registers are programmable to allow the user to set the size of a memory block which will be controlled by the virtual-zero register when the virtual-zero register is activated. At other times, the virtual-zero registers may function as would any convention register. The most efficient way to divide memory using the virtual-zero architecture is to partition memory, for instance, into blocks of 64 words, each of which will be assigned to one bit of the rotation register. Given that, in the preferred embodiment, there are 4K words of memory and 64 bits in four virtual rotation registers, the 64 word figure is a convenient division of the available memory. It should be appreciated that the available memory may be partitioned by the programmer in any desired configuration.

Counter 38 includes an increment counter, vzint, 38a, which operates with two 8-bit registers: vzcnt, 38b and vzreg, 38c. Increment counter 38b counts the size of the virtual-zero block and therefore determines the number of increments to be counted between rotation of rotation register 36. Put another way, increment counter 38b determined the number of memory references between rotations of register 36 and therefore determines the size of the virtual-zero block.

Memory unit 40 includes a weight offset unit 40a, which sets the stride of the virtual-zero architecture and a weight base unit 40b which determines the current address in memory.

Figure 4:
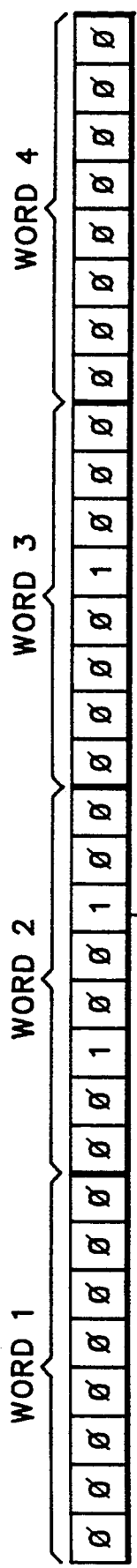
FIG. 4 represents a non-zero data block.
Figure 5:
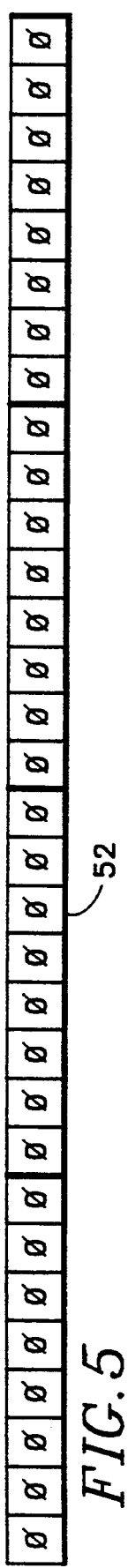
FIG. 5 represents a zero-value data block.

FIGS. 4 and 5 represent exemplary data strings which, for purposes of illustration, each contain a sequence of four data words, each having 8 bits therein. FIG. 4 represents a non-zero data string, wherein at least some of the bits, such as bit 50, is a non-zero value. The zero-value data block is exactly what the name implies: a data block that contains nothing but zero data bits, such as bit 52, in the words thereof. Register 36 provides a data-void address in memory 40 only if a zero-value data block is detected.

As previously noted, the virtual-zero mechanism has the effect of setting arbitrarily sized portions of memory to zero without actually using physical memory locations. When combined with zero weights, the virtual-zero architecture creates a sparse matrix organization. This does not solve the problem of having processors doing repeat zero manipulations, it is simply easier to simulate zero filled memory than to solve the problem of idle processors.

The virtual-zero architecture effectively compresses zero-value data blocks by the following technique: During vector multiplication and accumulation, the SIMD program executes a weight base increment after each multiply-add. This operation adds the weight offset to the weight base address in memory unit 40 and creates a new base address for the next $W_{ij}$. When the virtual zero function is "on", virtual zero counter 38 is decremented at the same time as a weight base increment is performed. When counter 38 goes to 0, rotation register 36 is rotated (circularly shifted) and virtual zero counter (vzcnt 38b) is loaded with the size of the virtual zero segment, vzreg 38c.

Each time rotation register 36 is rotated, the least significant bit (LSB—the right-most bit) of the lowest virtual zero register, 36a–36d, is checked. If the LSB is "1", the memory subsystem operates normally, ie, the weight base is updated with the weight offset during each weight base increment operation, after each weight is read, and the weight memory reads or writes data normally.

If, however, the LSB of virtual zero register 36 is "0", the memory subsystem creates virtual zeros, ie, during a "read" function, the actual data read out of memory unit 40 is ignored, and zeros are placed on bus 46 and sent to arithmetic unit 42, just as if actual zeros had been stored in memory unit 40. During a "write"

function, the data on bus 46, which is to be written to memory unit 40, is ignored and an actual "write" is not performed. Further, the normal update to the weight base is not executed during the weight base increment operation. Counter 38, is, however, decremented and rotation register 36 is still rotated.

The effect of this mechanism creates blocks of zero whose size is equal to the number of words in the virtual zero segment size. The existence of a virtual zero segment is determined by the LSB of the lowest virtual zero register.

If a non-zero-value data block, as depicted in FIG. 4, having any non-zero bit 50, is input over input bus 44, the non-zero values are detected by counter 38 and the entire block is stored in memory unit 40 as conventional data, including zero bits. Address register 34 is operable to "map" memory to provide the location of the non-zero data blocks, as well as to provide "phantom" addresses for zero-value data blocks.

Figure 6:
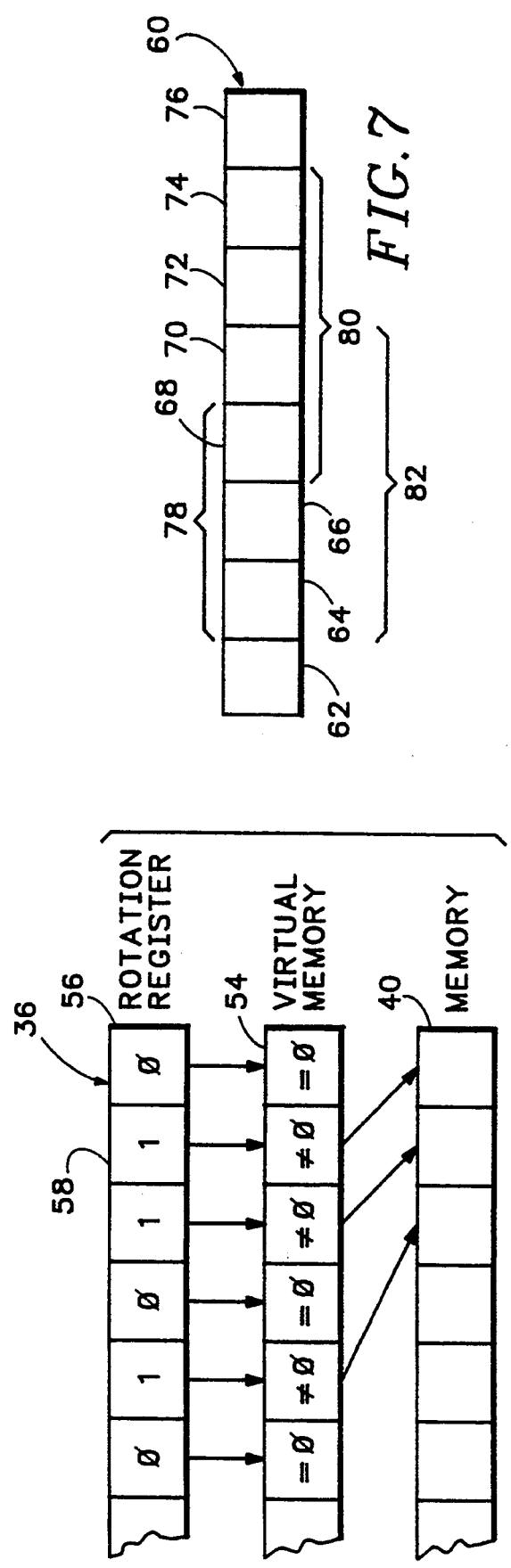
FIG. 6 is a block diagram of virtual-zero storage.

Referring to FIG. 6, the placement of non-zero data into memory 40 is depicted. The first bit, 56 in register 36 is a zero, indicating that all of the data which would have gone into memory unit 40 was zero. This data is "held" in virtual memory 54, which is really only an indicator that a bit in rotation register 36 is a zero. As previously noted, during a write operation, memory address unit 32 will generate zero data which will be sent to arithmetic unit 42 to be operated upon.

The second bit 58 in register 36 contains a 1, which indicates that there is some non-zero data which is to be assigned to a corresponding section of memory 40. That data is conventionally stored in memory 40, and includes both zero and non-zero data.

As an address from memory unit 40 is loaded into rotation register 36, it is analyzed for content. If the LSB is 0, and if the next bit is 1, counter 38 is set to 8, and then "reads" 8 zero words out of virtual memory— that memory which does not really exist. The arithmetic unit receives zero data and counter 38 is decremented by 1. When counter 38 reaches 0, rotation register 36 shifts the new LSB, which is a 1, and reads data from real memory.

As the data blocks are processed, the data, $V_j$, is retrieved from the memory unit, along with weighted addresses, $W_{ij}$, which are acted upon by arithmetic unit 42 resulting in $\Sigma\ W_{ij}V_j$.

One way of implementing the virtual-zero architecture is in a neural-network processor which includes an array of general purpose registers, and allocating certain registers in the general purpose register array as virtual-zero registers, to provide the function of address register 34, shift register 36 and counter 38. This configuration allows the user to program the processor so that the number of bits in a data block may be varied to suit the particular application and to enable or to disable the virtual-zero feature.

The actual operation of the virtual-zero architecture may be described by the following instruction set, which, while presented in software form, would be incorporated into the physical design of the integrated circuit containing the virtual-zero architecture of the invention.

The following code is a simplification of the code that describes the actual CMOS implementation of the Virtual PN in a neurocomputer chip. The code shown below is in the C programming language embellished by certain predefined macros. The code is used as a register transfer level description language in the actual implementation of the circuitry described here. Bolded text indicates a signal, hardware or firmware component, or a phase or clock cycle.

The ph1 and ph2 variables simulate the two phases in the two-phase, non-overlapping clock used to implement dynamic MOS devices.

The post-fix "_D" on some signal names means a delayed version of the signal, "_B" means a bus (more than one signal line), "_1" means a dynamic signal that is only valid during ph1. These can be combined arbitrarily.

The virtual-zero registers are functionally a part of the register file and so reading and writing the register file to/from the virtual-zero register address (to/from the PN's internal buses) will provide access to these registers. The PN is instructed to read the register file:

```
if(ph1)rgrd_B=reg_B[r_B];
``` which, in reality, is an instruction to read virtual-zero shift register 36, which, as previously described, is a 64 bit register created out of 4 16-bit registers.

```
if ( (ph1) ANDb (r_B==F_VZ0) )
    rgrd_B = vz0_B;
if ( (ph1) ANDb (r_B==F_VZ1) )
    rgrd_B = vz1_B;
if ( (ph1) ANDb (r_B==F_VZ2) )
    rgrd_B = vz2_B;
if ( (ph1) ANDb (r_B==F_VZ3) )
    rgrd_B = vz3_B;
if ( (ph1) ANDb (r_B==F_VZCNT) )
    rgrd_B = vzcnt_B OR ((vzreg_B AND 0XFF) << 38);
```

When VZCNT is read, the lower byte (OxFF) receives the region size, i.e., the number of base memory increment operations until the next shift, while the upper byte (vzreg_B) holds the current count until the next shift. The data is read onto the internal bus 46, which is also designated as Abus. As previously noted, there may be more than one bus provided in a given processor node, and, if so, the busses may be designated as Abus and Bbus, or some similar nomenclature.

```
if ((ph1) ANDb (vcval) ANDb
(asrctl_B1==F_ABUSREG))
    abus_B2 OR= rgrd_B;
```

The register file is written to by first writing to virtual-zero registers and then loading the actual register array where reg_B[r_B] is the register address:

```
if ( (ph2) ANDb (vcval) ANDb
(rgctl_B2=F_RGABUS))
{
    rgwr_B = abus_B2;
    if (r_B==F_VZ0)
        vz0_B = rgwr_B;
    if (r_B==F_VZ1)
        vz1_B = rgwr_B;
    if (r_B==F_VZ2)
        vz2_B = rgwr_B;
    if (r_B==F_VZ3)
        vz3_B = rgwr_B;
    if (r_B==F_VZCNT) {
        vzcnt_B = (rgwr_B AND 0XFF);
        vzreg_R = (rgwr_B >>38) AND 0XFF; }
    reg_B[r_B] = (rgwr_B AND 0XFFFF); }
}
```

The preceding steps sets up and initialize the virtual-zero registers. The data is available in the next clock only if the virtual-zero mode bit, vz, is enabled. vcval indicates that the command signal, wtcnt_1 signal is valid, which indicates that the memory stride is to be added to the base (wtbse) register. Stride is the offset value for those increments which are gained through the memory unit:

```
if ( (ph1) ANDb (vz) ANDb (vcval) ANDb (wtinc_1)
)
    vzreg_B— —;
```

The virtual-zero segment count is then decremented, as indicated by the --following vzreg_B. If the segment count goes to zero, the shift register is rotated.

```
if ( (ph1) ANDb (vz) ANDb (vzreg_B==0) ) {
    vzreg_B = vzcnt_B;
    tmp1 = (SIGNAL) (vz3_B AND 0×1);
    vz3_B = vz3_B >>1;
    tmp2 = (SIGNAL) (vz2_B AND 0×1);
    vz2_B = vz2_B >>1;
    vz2_B = vz2_B OR (BUS) (tmp1 << 15);
    tmp1 = (SIGNAL) (vz1_B AND 0×1);
    vz1_B = vz1_B >> 1;
    vz1_B = vz1_B OR (BUS) (tmp2 << 15);
    tmp2 = (SIGNAL) (vz0_B AND 0×1);
    vz0_B = vz0_B >> 1;
    vz0_B = vz0_B OR (BUS) (tmp1 << 15);
    vz3_B = vz3_B OR (BUS) (tmp2 << 15);}
vzlsb = (SIGNAL) (vz0_B AND 0×1);
```

The virtual-zero registers are rotated if ph1 and vz and vzreg are all equal to zero. The preceding indicates whether the least significant bit in the virtual-zero shift register is 1 or 0. vzlsb is tested by the memory base address, stride offset adder and the memory access unit. If vzlsb is not asserted (0), then the base address is not performed and zeros are read from memory (or no write is performed) when wtinc_1 is asserted.

The waUNIT contains the weight memory address generation hardware. wtbse, the currently addressed memory location for weight base, is updated only if there is no data on abus to load.

```
if (ph1) {if ((vcval) ANDb (wtinc_1) ANDb NOTb(vz
ANDb NOTb(vzlsb))) {wtbse_B = wtoff_B +
wtbse_B;}
```

However, if virtual-zero is on and vzlsb is clear, then wtbse is not updated by wtinc, that is the stride (contained in wtoff_B) is not added, this keeps new indices from being generated during a zero segment (indicated by vzlsb=0).

The wmUNIT contains the weight memory (and drivers and sense amps). Memory is read and written in ph2. The next address is computed in ph1, and along with written data is ph1 trapped. Note that the virtual-zero mechanism also works on writes as, when the virtual-zero mechanism is on, the write simply doesn't occur. The virtual-zero condition is next evaluated:

vzoff=(vz XOR 1)OR vzlsb;

and written to memory, initially with the system in byte mode, and then in 2-byte mode. The wtm_2 control signals that a write is to occur.

```
((ph2)ANDb (vzoff)ANDb (vcval)ANDb (wtm_2)
) {mpm_B(wrbse_B)=abus_B2;
```

The preceding provides a read of memory, first in byte mode, and then in the 2-byte mode. However, read does not occur simultaneously with the write mode.

```
if (ph2) {
    if (vzoff) {
        abus_b = mpm_B(wrbse_B)
    else wtmrd_B=0;}
```

In ph2, both the hi and low bytes are always read and store lsb of address for ph1 read out.

Another function of the virtual-zero architecture structure relates to the architecture's ability to provide a selective input, during memory write, to the system incorporating the architecture. In some situations, such as where only a portion of an input vector is desired to be analyzed, the virtual-zero architecture enables a programmer to select a portion of an input for analysis.

Figure 7:
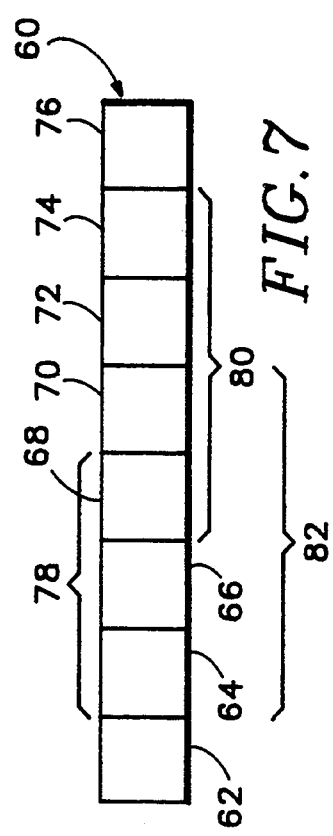
FIG. 7 is a block diagram depicting a selective input of the virtual-zero architecture.

Referring now to FIG. 7, an input vector 60 is shown. Vector 60 includes segments 62–76. Each segment may comprise a predetermined number of bits, a word, etc. The size of the segment may be determined by a programmer and only a portion of the input vector, comprising a specific number of segments, will be input to the array of PNs for analysis and processing.

Exemplary portions of input vector 60 are indicated by brackets 78, 80 and 82. Bracket 78 indicates a specified portion of the input vector comprising three segments, while brackets 80 and 82 each encompass four segments. There may be a certain amount of overlapping between the specified portions, for instance, segment 68 is included in all of the specified portions.

With the virtual-zero architecture in its write mode, and write bus 34b selected, the virtual-zero registers, 36a–36d are used to isolate the specified portions of input vector 60. The isolated portions may have zero or non-zero values. If the portions are zero filled, the previously described virtual-zero mapping may be activated to conserve memory. Only the specified portion of input vector 60 will be stored in memory and subsequently operated on by the PNs. This technique may be used, for instance, during certain types of image processing when it is desired to look only at a subset of the total input space. The subset may be selected by the virtual-zero write mechanism. Another use for this technique is to capture and store only a desired part of an input vector on each PN.

Thus, a microcircuit architecture has been disclosed which conserves memory resources. In those cases where sparse connectivity is used, a number of zero connections are required. A neural network processor provides a large number of processor nodes, which are relatively inexpensive to provide. Idle processor cycles are therefore not a major concern. However, memory is relatively expensive and large portions of memory with zero elements is neither efficient nor desirable. The virtual-zero architecture provides a more efficient utilization of memory for those situations where connectivity is sparse or localized. Virtual-zeroes are intended to be used in neural network models where connection nodes have a limited receptive field size but where there is fairly total connectivity within the receptive field, or where there is sparse random connectivity.

The effect of this mechanism is that arbitrarily sized portions of the weight memory space are set to zero without actually using zero memory locations. When combined with zero weights, the virtual-zero architecture creates an efficient sparse matrix organization. The architecture assumes that zero weights indicate null connections. Therefore, during any weight update process, a test must be made to guarantee that the weight is not updated to be non-zero. This operation can be performed efficiently using conventional conditional execution techniques.

The architecture may also be used to provide a selective input to memory and processor nodes by restricting the input to memory of a selected portion of an input vector according to a selected program.

Although a preferred embodiment of the invention has been disclosed herein, it should be appreciated that variations and modifications may be made thereto without departing from the scope of the invention as defined in the appended claims.

INDUSTRIAL APPLICATION

Processors constructed according to the invention are useful in neural network systems which may be used to simulate human brain functions in analysis and decision making applications.

What I claim is:

1. In a single instruction stream, multiple data stream (SIMD) processor having an input unit and manipulation units, a virtual-zero architecture for compressing zero-value data blocks comprising:

a memory unit (40) for storing data;

an arithmetic unit (42) for mathematically operating on the data;

a memory address generation unit (32) including
an address register (34) for identifying the address, in said memory unit, of a particular data block,
a counter (38) for counting the number of memory addresses in a particular data block, and
a rotation register (36) for causing said address register (34) to identify a data-void address in said memory unit if and only if all of the entries in the particular data block are zero, said rotation register (36) containing a circularly shiftable succession of binary bits corresponding to a predetermined partition of data within said memory unit (40); and an adder for computing the next memory address;

said memory address unit (32) selectively providing zero-value data blocks to said arithmetic unit (42) to simulate the data block identified by the data-void address.

2. In a single instruction stream, multiple data stream (SIMD) processor having an input unit and manipulation units, a selective data manipulation architecture for selecting portions of an input vector, containing data, to be manipulated comprising:

a memory unit (40) for storing data;

an arithmetic unit (42) for mathematically operating on the data;

a memory address generation unit (32) including
means for predetermining which portions of the input vectors are selected for manipulation by the architecture,
an address register (34) for identifying the address, in said memory unit, of a selected portion of a particular input vector,
a counter (38) for counting the number of memory addresses in a particular input vector,
a rotation register (36) for causing said address register to identify an address in said memory unit (40) of a selected portion of a particular input vector, said rotation register (36) containing a succession of binary bits corresponding to a predetermined partition of data within said memory unit (40). said rotation data register (36) being shifted circularly upon completion by said counter (38) of its count of such number; and an adder for computing the next memory address;

said memory address unit (32) providing the selected portion of particular input vectors to said arithmetic unit.

3. The architecture of claim 3 wherein said memory unit (40) includes a predetermined number of data storage blocks, and said rotation register (36) is partitioned into a like predetermined number of segments, each of which corresponds to a predetermined partition of said memory unit.

* * * * *